March 5, 1929.  W. F. SLATER  1,704,518
GAS AND LIQUID CONTACT APPARATUS
Filed April 30, 1926   6 Sheets-Sheet 1
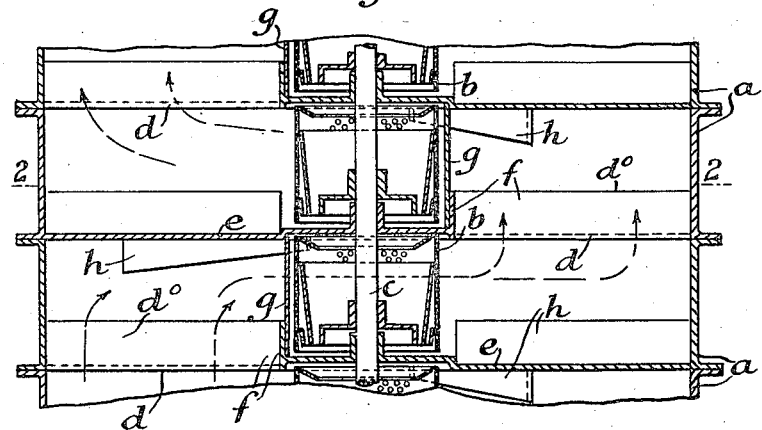
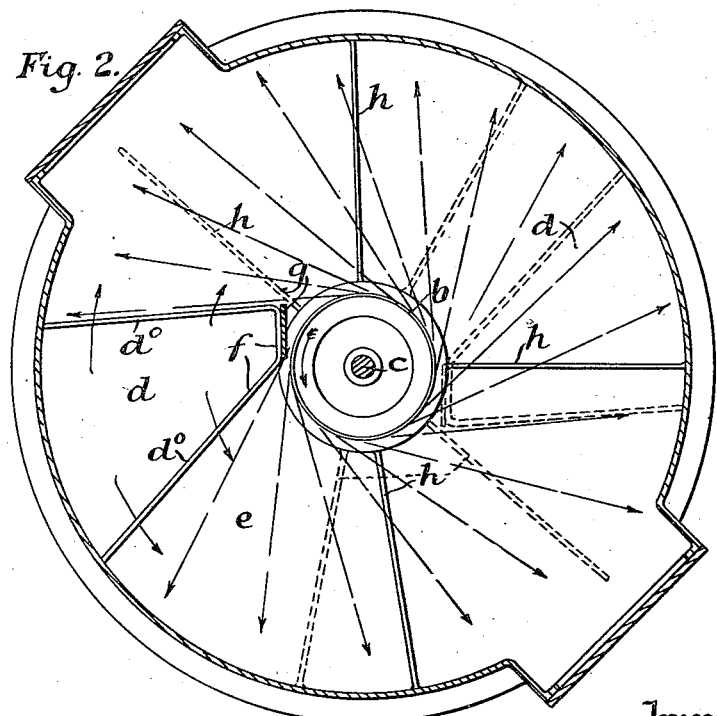
Inventor.
Walter F. Slater
By George A. Prevost
atty March 5, 1929.  W. F. SLATER  1,704,518
GAS AND LIQUID CONTACT APPARATUS
Filed April 30, 1926   6 Sheets-Sheet 2
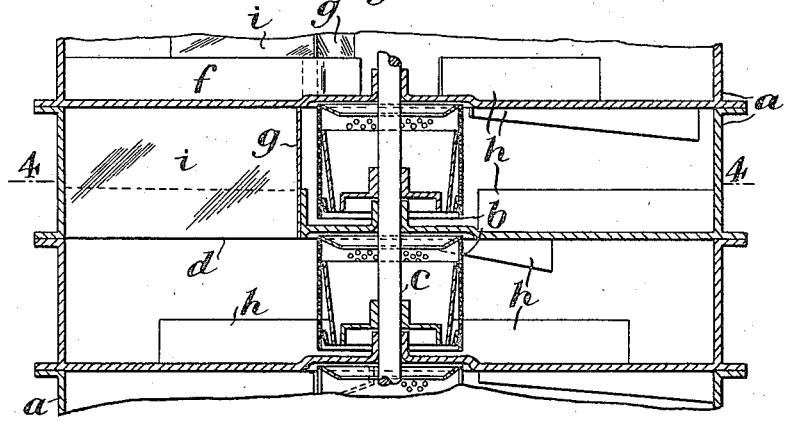
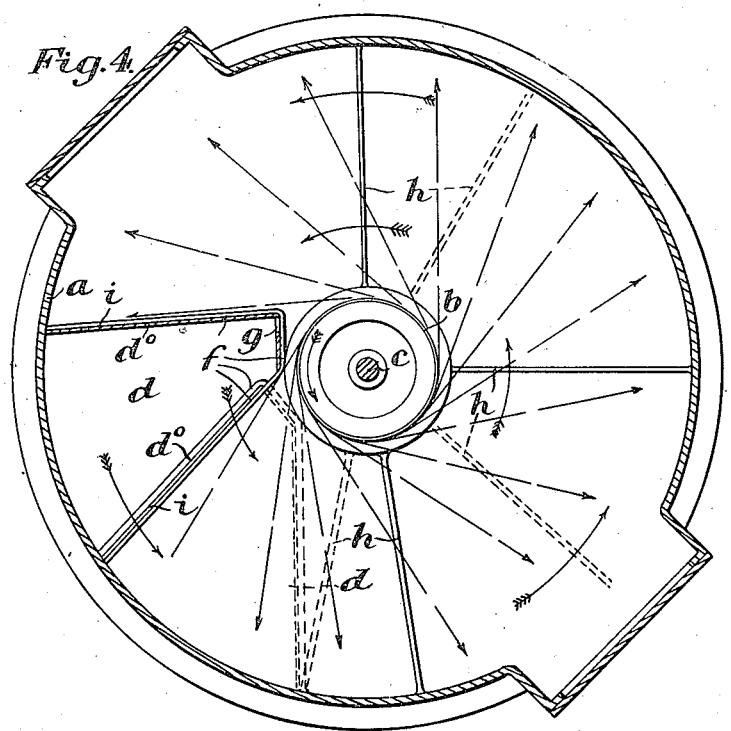
Inventor:
Walter F. Slater
By George A. Prevost
atty.

March 5, 1929.  W. F. SLATER  1,704,518
GAS AND LIQUID CONTACT APPARATUS
Filed April 30, 1926  6 Sheets-Sheet 4
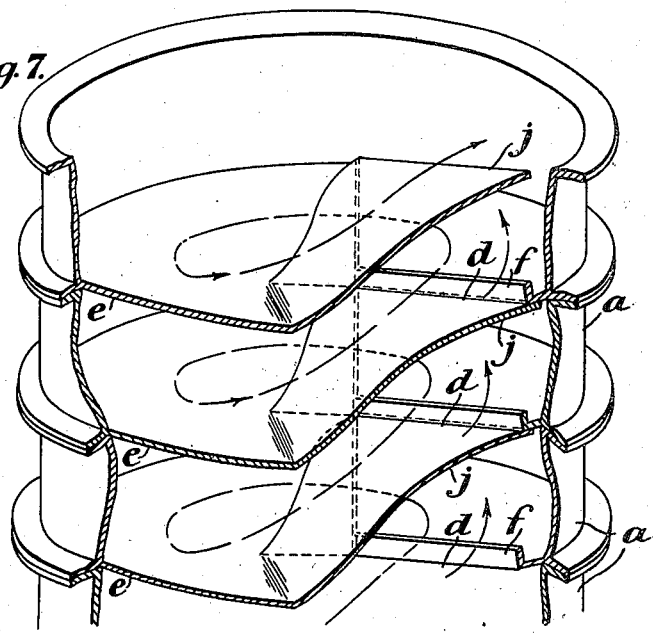
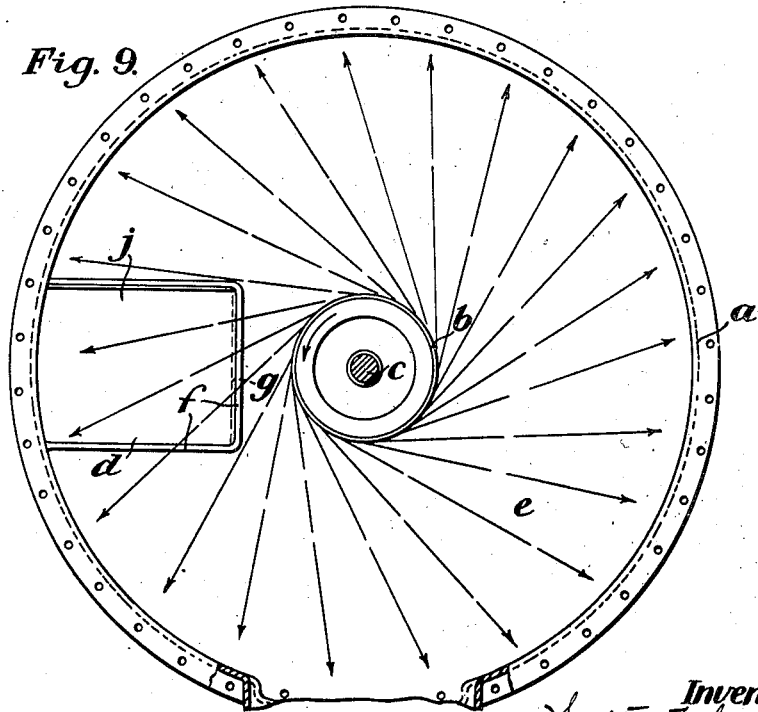

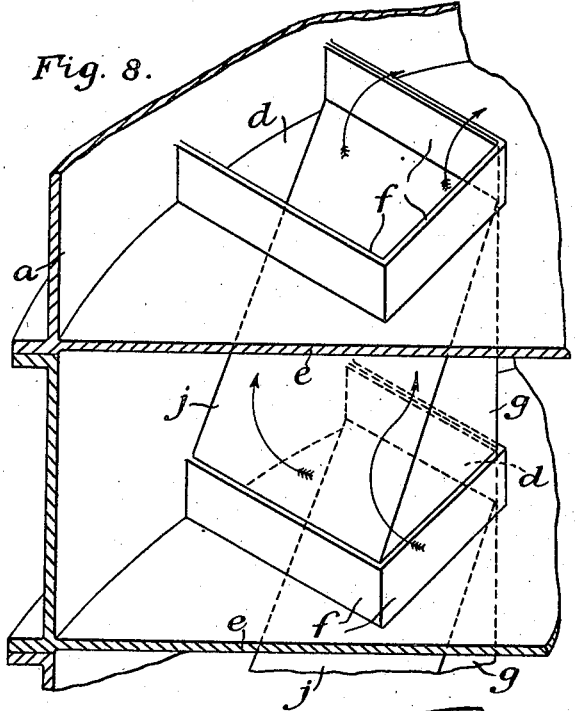
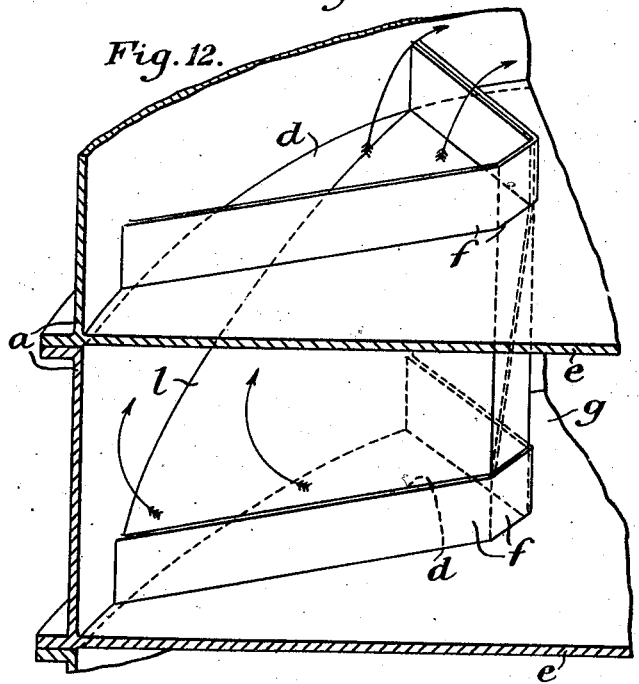

March 5, 1929.  W. F. SLATER  1,704,518
GAS AND LIQUID CONTACT APPARATUS
Filed April 30, 1926  6 Sheets-Sheet 6
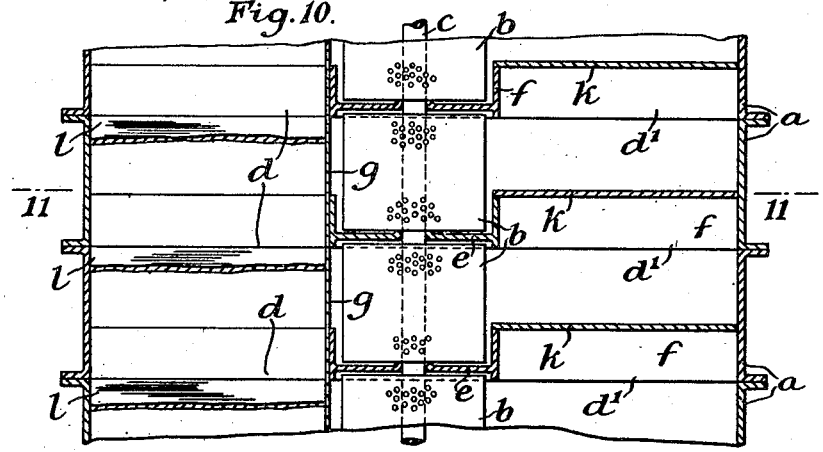
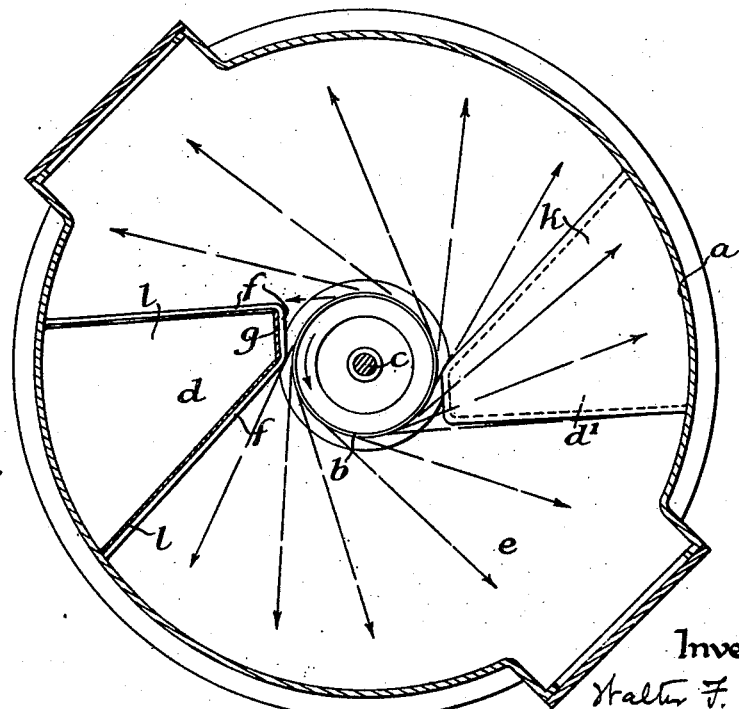

Patented Mar. 5, 1929.

1,704,518

UNITED STATES PATENT OFFICE.

WALTER FRENCH SLATER, OF MANSFIELD, ENGLAND, ASSIGNOR TO KIRKHAM, HULETT & CHANDLER LIMITED, OF LONDON, ENGLAND.

GAS AND LIQUID CONTACT APPARATUS.

Application filed April 30, 1926, Serial No. 105,685, and in Great Britain May 25, 1925.

This invention relates to apparatus for effecting intimate contact between liquids and gases as, for example, is used for the extraction of ammonia and other impurities found in coal gas, comprising a series of superposed chambers each furnished with a rotary spraying device of approximately the full depth of the chamber, the series of sprayers being mounted on a common vertical shaft extending through the chambers and the gas to be treated flowing upwardly through the series of chambers whilst the liquid flows in the opposite direction.

According to the invention each chamber is provided with an opening or openings in its floor, for the passage of the gas and liquid in opposite directions, the gas passing through the opening flowing around the chamber either as a single stream in one direction or separating into two streams one on each side of the chamber, the opening or each opening having an upstanding flange or lip to allow of the accumulation of a layer of liquid on the bottom of the chamber to supply the sprayer therein and with a baffle to cut off the sprayed liquid from passing through the opening or openings.

The opening or openings in the floors of the chambers, may be arranged in any suitable manner and in conjunction with baffles for bringing the gases into intimate contact with the sprayed liquid.

To enable the invention to be fully understood I will describe it by reference to the accompanying drawings, in which:—

Figure 1 is a sectional elevation of a portion of apparatus constructed in accordance with my invention for effecting intimate contact between liquids and gases.

Figure 2 is a horizontal section on the line 2—2, Figure 1.

Figure 3 is a view similar to Figure 1, illustrating a modification and

Figure 4 is a horizontal section on the line 4—4, Figure 3.

Figure 7 is a sectional perspective diagrammatic view of the arrangement illustrated in Figures 5 and 6.

Figure 8 is a sectional perspective diagrammatic view of another modification and Figure 9 is a sectional plan view of the same.

Figure 10 is a view similar to Figure 1, of another modification and

Figure 11 is a horizontal section on the line 11—11, Figure 10.

Figure 12 is a sectional perspective diagrammatic view of the arrangement illustrated in Figures 10 and 11.

Figure 5:
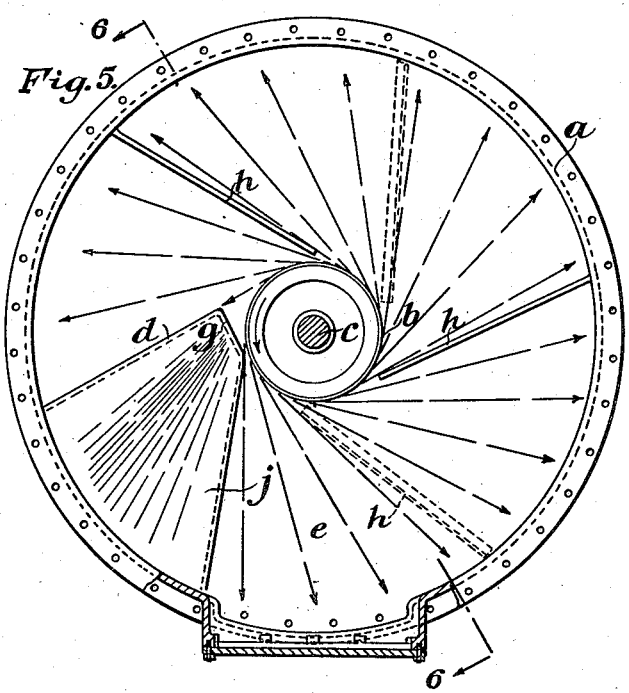
Figure 5 is a view in horizontal section, illustrating a further modification

Referring to Figures 1 and 2, $a$, $a$ are the superposed chambers each furnished with a rotary spraying device $b$ for the liquid and of approximately the full depth of the chamber.

In the drawings, the devices $b$ each comprise a basket peripherally perforated but any other convenient construction may be employed. The series of sprayers $b$ is mounted upon the common vertical shaft $c$ extending through the chambers. The gas to be treated enters the lowermost chamber, not shown, of the series, and passes up through a preferably segmental opening $d$ in the floor $e$ of the superposed chamber into the latter, this segmental form having the opposed sides $d^0$ arranged approximately tangential to the peripheries of the sprayers $b$. $f$, $f$ are the flanges or lips with which the segmental opening $d$ is furnished so as to allow of the accumulation of a layer of liquid in the bottom of the chamber and $g$ is the baffle provided at its inner end so as to cut off the sprayed liquid from the said opening. The gas which passes up through this opening $d$ is then deflected to both sides as indicated by the solid arrows and passes around the chamber in opposite directions coming into intimate contact with the sprayed liquid and eventually passes out through a second segmental opening $d$ diametrically opposite, or approximately diametrically opposite to the first segmental opening, into the next superposed chamber $a$. It will thus be seen that the liquid, which passes down through the successive chambers in the ordinary way and is discharged from the sprayers in each chamber, is brought into very intimate contact with the gas which passes up through the series of chambers in the manner above described. To further increase the path of the gas, a series of vertical baffles $h$, $h$ may be provided within each chamber, projecting from the bottom of the chamber and depending from the top thereof, respectively, so that the gas is caused to pursue a staggered path as it flows around the chamber in both directions from the inlet $d$.

In the modified construction of apparatus illustrated in Figures 3 and 4, the gas, on passing through the inlet $d$, is deflected by a vertical baffle $i$ so as to pass in one direction only around the chamber as indicated by the solid arrows and is discharged into the next superposed chamber $a$ through an opening $d$ which is displaced relatively to the first mentioned inlet opening, that is to say, to one side thereof in plan view as indicated in Figure 4.

Figure 6:
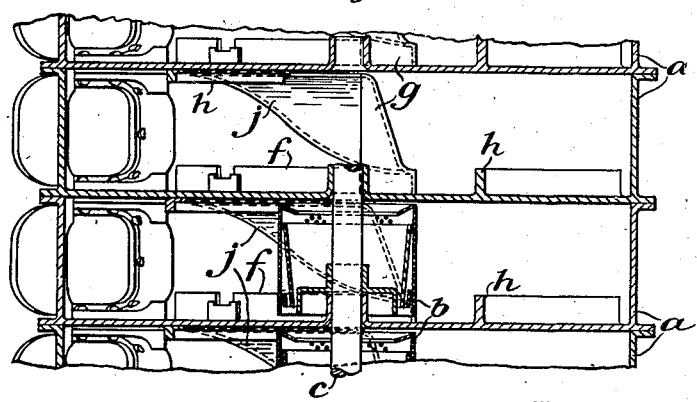
Figure 6 is a vertical section on the line 6—6, Figure 5.

In the modified construction illustrated in Figures 5 to 9 the gas openings in the series of superposed chambers are located immediately above one another, the gas passing completely around the chambers as in the construction illustrated in Figures 3 and 4, and being prevented from passing directly from opening to opening by inclined or curved deflectors or baffles $j$ in addition to the baffles $g$ between the superposed openings $d$ and which cause the gas entering one chamber $a$ to pass around the said chamber, and when it has completed its circular course, deflecting it into the inlet to the next superposed chamber $a$. The deflectors shown in Figures 5 to 7 are shaped with their surfaces at all points parallel with lines tangential to the peripheries of the sprayers $b$ and coinciding with the direction of the spray therefrom.

In the construction illustrated in Figures 5 to 7 the baffles $j$ are of curved form and cast or made integral with the chambers, whilst in the construction illustrated in Figures 8 and 9 the baffles $j$ are made of flat plates secured to the flanges or dams $f$. In these latter figures the openings $d$ are shown as being of substantially rectangular form.

The gas may be caused to pass either with or against the spray by reversing the angle of the baffle plate.

In the construction illustrated in Figures 10, 11 and 12, each of the superposed chambers $a$ is furnished with two openings $d$, $d^1$ of segmental shape, as above described, and the entering gas is caused to pass either completely around each chamber as in the construction illustrated in Figures 5 to 9, or in different directions half-way around the same, as in the construction illustrated in Figures 1 and 2. Where the gas is required to pass completely around each chamber, the additional openings $d^1$ in each chamber is blocked by a plate $k$, Figs. 10 and 11 and baffle plates $l$ similar to the baffle plates $j$ described with reference to the construction illustrated in Figures 5 to 9 are made use of, in conjunction with the openings $d$, to cause the gas to pursue the correct path. If the apparatus is to function so that the gas passes in different directions half-way round each chamber, one of the openings in each chamber is closed by a plate such as $k$, that is to say, the right-hand opening $d^1$ in one chamber, the left-hand opening $d$ of the next, and so forth, so that the gas pursues a zig-zag or tortuous course through the series of chambers.

Having now particularly described and ascertained the nature of my said invention and in what manner the same is to be performed, I declare that what I claim is:—

1. The combination of a vertical scrubber shell, a vertical shaft extending axially therethrough, a baffle structure in said shell arranged to produce in cooperation with the shell, a substantially continuous spiral gas passageway from the bottom to the top of the shell, and a rotary sprayer structure carried by said shaft and forming part of the baffle structure.

2. In a gas scrubber, the combination of a vertical shell, a shaft extending axially therethrough, a plurality of substantially horizontal partitions sub-dividing said shell into spray chambers, each partition being provided with an off-set portion which registers with the next higher partition, and rotatable sprayer elements, one for each chamber, mounted on said shaft, said partitions and their off-set portions cooperating with the sprayer elements and shell to form a continuous approximately spiral gas passageway within the shell.

3. In a gas scrubber, the combination of a vertical shell, a shaft extending axially therethrough, a series of substantially horizontal partitions sub-dividing said shell into spray chambers, each partition being provided with an off-set portion which registers with the next higher partition, rotary sprayer elements, one for each chamber, mounted on said shaft, said partitions and their off-set portions cooperating with the sprayer elements and shell to form a continuous approximately spiral gas passageway through the scrubber, and dams, one located approximately at the junction of the off-set portion of each partition with the next higher partition.

4. Apparatus for effecting intimate contact between liquid and gases flowing in opposite directions therethrough, comprising a shell containing a series of superposed chambers, a circular baffle obstructing the central portion of each chamber and of approximately the full depth of each chamber, a rotary spraying device forming part of each baffle, a vertical shaft extending through the chambers and baffles and carrying said spraying devices, the floor of each chamber having an opening therein, said openings and baffles being so arranged that the gas in passing through a chamber from one opening to the next, is constrained to flow around the baffle in that chamber, and means for preventing liquid on any floor of the apparatus from flowing through any of said openings to the chamber immediately below that floor.

5. An apparatus as claimed in claim 4, including auxiliary baffles arranged in the chambers for preventing the sprayed liquid from spraying through said openings.

6. Apparatus as claimed in claim 4, wherein each of said openings is of a shape having four sides, a baffle plate coinciding with one of said sides for cutting off the sprayed liquid from the opening whilst the two opposite sides connected to the side which coincides with the baffle plate, are approximately tangential to the peripheries of the circular baffles.

7. Apparatus as claimed in claim 4, including an auxiliary baffle extending across each chamber, all of said baffles and openings being so disposed that the gas will flow in one direction only around each chamber before passing upwardly through an opening to the chamber immediately above.

8. Apparatus as claimed in claim 4, including auxiliary baffles arranged in the chambers, each auxiliary baffle extending across one of the chambers and functioning to deflect gas upwardly through one of the openings into the chamber immediately above, said auxiliary baffles being of such shape and so disposed with reference to the openings that the gas deflected by the auxiliary baffles is wholly under the action of the spray without the said auxiliary baffles impeding the latter.

WALTER FRENCH SLATER.